United States Patent [19]
Wise et al.

[11] Patent Number: 5,884,262
[45] Date of Patent: *Mar. 16, 1999

[54] COMPUTER NETWORK AUDIO ACCESS AND CONVERSION SYSTEM

[75] Inventors: Laird H. Wise, Ellicott City; Efstathios Mavrotheris, Hyattsville, both of Md.; James E. Curry, Herndon, Va.

[73] Assignee: Bell Atlantic Network Services, Inc., Arlington, Va.

[ * ] Notice: This patent issued on a continued prosecution application filed under 37 CFR 1.53(d), and is subject to the twenty year patent term provisions of 35 U.S.C. 154(a)(2).

[21] Appl. No.: 623,103

[22] Filed: Mar. 28, 1996

[51] Int. Cl.$^6$ .............................. G06F 19/00; H04M 1/66
[52] U.S. Cl. ..................... 704/270; 704/275; 704/271; 379/67; 379/88; 395/200.49
[58] Field of Search .......................... 395/2.79, 2.69, 395/2.8, 2.75, 2.84, 500, 200.49, 200.48, 200.57; 379/96, 97, 98, 88, 89, 201, 67; 704/270, 271, 275

[56] References Cited

U.S. PATENT DOCUMENTS

| | | | |
|---|---|---|---|
| 3,704,345 | 11/1972 | Coker et al. | 179/15 A |
| 4,185,169 | 1/1980 | Tanimoto et al. | 179/15 M |
| 4,227,176 | 10/1980 | Moshier | 340/148.3 R |
| 4,227,177 | 10/1980 | Moshier | 340/146.3 R |
| 4,525,793 | 7/1985 | Stackhouse | 364/513.5 |
| 4,785,408 | 11/1988 | Britton et al. | 364/513.5 |
| 4,856,066 | 8/1989 | Lemelson | 381/36 |
| 4,922,538 | 5/1990 | Tchorzewski | 381/42 |
| 4,931,950 | 6/1990 | Isle et al. | 364/513 |
| 4,942,616 | 7/1990 | Linstroth et al. | 381/51 |
| 4,979,206 | 12/1990 | Padden et al. | 379/67 |
| 4,980,826 | 12/1990 | Wagner | 364/408 |
| 5,040,218 | 8/1991 | Vitale et al. | 381/52 |
| 5,164,981 | 11/1992 | Mitchell et al. | 379/88 |
| 5,220,652 | 6/1993 | Rowley | 395/275 |
| 5,285,387 | 2/1994 | Kurahara et al. | 364/419.09 |
| 5,297,194 | 3/1994 | Hunt et al. | 379/88 |
| 5,333,237 | 7/1994 | Stefanopoulos et al. | 395/12 |
| 5,390,237 | 2/1995 | Hoffman, Jr. et al. | 379/67 |
| 5,463,713 | 10/1995 | Hasegawa | 395/2.69 |
| 5,555,343 | 9/1996 | Luther | 395/2.69 |
| 5,572,625 | 11/1996 | Raman et al. | 395/2.69 |
| 5,572,643 | 11/1996 | Judson | 395/793 |
| 5,583,922 | 12/1996 | Davis et al. | 379/96 |
| 5,638,425 | 6/1997 | Meador, III et al. | 379/88 |
| 5,652,866 | 7/1997 | Aldred et al. | 395/500 |
| 5,799,063 | 8/1998 | Krane | 379/67 |
| 5,805,815 | 9/1998 | Hill | 395/200.48 |
| 5,809,250 | 9/1998 | Kisor | 395/200.57 |

*Primary Examiner*—David R. Hudspeth
*Assistant Examiner*—Susan Wieland
*Attorney, Agent, or Firm*—Fulbright & Jaworski LLP

[57] ABSTRACT

The computer document audio access and conversion system allows a user to access information originally formatted for audio/visual interfacing on a computer network via a simple telephone. Of course, files formatted specifically for audio interfacing can also be accessed by the system. A user can call a designated telephone number and request a file via dual-tone multi-frequency (DTMF) signalling or through voice commands. The system analyzes the request and accesses a predetermined document. The document may be in a standard document file format, such as hyper-text mark-up language (HTML) which is used on the World Wide Web. The document is analyzed by the system, and depending on the different types of formats used in the document, information is translated from an audio/visual format to an audio format and played to the user via the telephone interface. The document may contain links to other documents which can be invoked to access such other documents. In addition, the system can have a native command capability which allows the system to act independently of the accessed document contents to replay a document or carry out functions similar to those available in conventional web browsers.

38 Claims, 4 Drawing Sheets

COMPUTER NETWORK AUDIO ACCESS AND CONVERSION SYSTEM

BACKGROUND OF THE INVENTION

1. Field of the Invention

This invention relates to accessing information from a computer network via a telephone, PDA equipped with an audio input/output or other portable device, speaker phone, or other audio device. More specifically, this invention relates to dynamically converting standard document formats, such as hyper-text mark-up language (HTML), standardized graphic mark-up language (SGML), Hytime, and electronic mail (E-mail), for use in an audio interface, locally or over a telephony network.

2. Discussion of the Related Technology

Voice mail and other interactive voice response (IVR) systems allow a user to access audio information stored in a computer memory such as a hard disk. Typically, the audio information is stored in audio files created either by the user or for the user. Conventional IVR systems use dual-tone multi-frequency (DTMF) signalling to allow the user to interact with the server through a standard telephone keypad. Pre-recorded audio information is available on IVR systems in the form of instructional phrases such as "Please type in your account number followed by the pound sign."

Pre-recorded audio is also used for introductory phrases such as "Your account balance is . . . " At this point, the IVR computer may access a connected database that stores the requested account balance in numerical format, convert the numerical format to an audio format using a numerical text-to-speech engine, and state the account balance. This conversion from numerical format to audio format is extremely rigid and completely predefined. IVR systems are "closed" in that each IVR system is uniquely designed, not connected to a computer network, and IVR systems cannot be used interchangeably. Also, these IVR systems are designed specifically for audio interaction.

In contrast, audio/visual information on a audio/visual server in a computer network may be accessed using a personal computer. For example, a World Wide Web (Web) page on the Internet may be accessed using a computer linked through an Internet access provider, such as America On Line™ or Prodigy™, to a Web server. In certain situations, however, use of a computer may not be feasible or access to a computer may not be possible. For example, a cellular telephone user driving an automobile may want to know about traffic in the surrounding area, however, the user cannot operate a computer while in the car. In situations such as this, an audio interface may be useful for obtaining information from the Internet or another computer network.

Other situations where an audio interface to a computer network may be useful include accessing an electronic calendar on a local area network (LAN) to receive or modify an itinerary, accessing E-mail on the Internet or a wide-area network (WAN) while away from a computer, and requesting a telephone number from an electronic yellow pages or white pages while at a pay phone. An audio interface to the Web could also be used to traverse the Internet and obtain information residing on various Web servers.

Thus, there is a need for flexible access to various types of computer networks via an audio interface. There is a need for interactive telephone access to a computer network. There is also a need for dynamic conversion of an audio/visual file format to a pure audio format.

SUMMARY OF THE INVENTION

The computer network audio access and conversion system allows a user to access information originally formatted for audio/visual interfacing on a computer network via a simple telephone. Of course, information formatted specifically for audio interfacing, such as information from voice mail and other IVR systems, can also be accessed by the system. A user can call a designated telephone number and request information via DTMF signalling or through voice commands. The system analyzes the user's request, establishes a connection with a target computer network, and finds and retrieves the requested information in a standard document file format, such as HTML which is used on the World Wide Web. The document file is analyzed by the system, and depending on the different types of structures used in the file, information is translated from an audio/visual format to an audio format and played to the user via the telephone interface. Typically, the system will use a text-to-speech engine to convert the document to audio information.

For example, if a Web page is returned from the Internet, the title of the Web page may be read in a low male voice. Headline information (or text formatted above a certain typesize) may be read in a female voice. General text information (or text formatted below a certain typesize) may be read in a different voice. A hyper-text link may be read in a contrasting voice, or a bell sound may be used to indicate a hyper-text link. Hyper-text lists may be read to the user in a menu format with an opportunity for the user to select a list entry following the speaking of each entry by the system. This may be accomplished by passing the document through a parser to interpret its contents. The document may then be passed through a text-to-speech engine to read the text. The engine may be responsive to the parser in order to select the voice that is used. In addition, the parser will select what portions of the document are converted to speech.

Throughout the speaking of the Web page, a user may interact with the system through DTMF signalling or voice control. For example, the user may press 1 to indicate the selection of a hyper-text link during a one second period after a hyper-text link is indicated. Or the user may speak a list entry after the speaking of a hyper-text list to select a hyper-text link.

The user interaction is the mechanism by which a user navigates between and within the documents. The system may present navigation options in order to assist the user in the form of a menu or simply by using a recognized voice or other audio signal to designate navigational options. The system may permit navigation based on the content of a document or other criteria.

The user command may be DTMF signals or other recognized signaling methods, or by voice response. The voice response system may be a voice recognition system where the voice recognition will attempt to match a speech input to a preselected list of potential selections or choices. The preselected list can be thought of as the dictionary of words that the voice recognition system will recognize. The voice response system may alternatively be a speech-to-text system which will simply convert a user command to text which will then be used by the system to control navigation.

According to an advantageous feature, the system will respond to a user input to navigate the document or documents based on content of the document. All documents may contain content which is useful for navigation. For example, an HTML document may contain tags designating links or portions of a document. The system will attempt to navigate to a location corresponding to a user command and effect any action possible at that location. For example, if the command corresponds to a link, then the system will take the linked action (such as play an audio file or jump to another document). If the command corresponds to textual content, the system will skip to the next occurrence corresponding to the command in the document. For example, in a document containing a list of stock symbols and quotes, if a user inputs a command corresponding to a stock symbol, the system may skip ahead to the symbol and begin "reading" at the location of the stock symbol.

Also, advanced intelligent network (AIN) features may be incorporated into the system to allow access to individual user profiles using caller identification (ID) information, location profiles using location ID information, user preferences, and sensitive networks using a combination of caller ID, password, and voice recognition information. Additionally, an AIN connection may be used to designate a home page for an individual user, define other preferences, or enhance security by implementing encryption or communicating encryption keys.

Accordingly, it is an object of the invention to provide an audio information presentation system for accessing and navigating through electronic documents and presenting information contained in documents which are not constrained by an audio compatible format. It is a feature of the invention to permit access to electronic information, which is not specifically formatted for audio retrieval, without the requirement of a traditional computer access device. The system is suited for accessing information contained on a computer network, including the internet, without a computer terminal. Information may be accessed over the telephone by people without a computer or individuals with special needs such as those who may have difficulty using a computer, i.e., visually impaired, mobility impaired, or individuals with other requirements that make using a computer difficult.

DETAILED DESCRIPTION OF THE PREFERRED EMBODIMENTS

Figure 1:
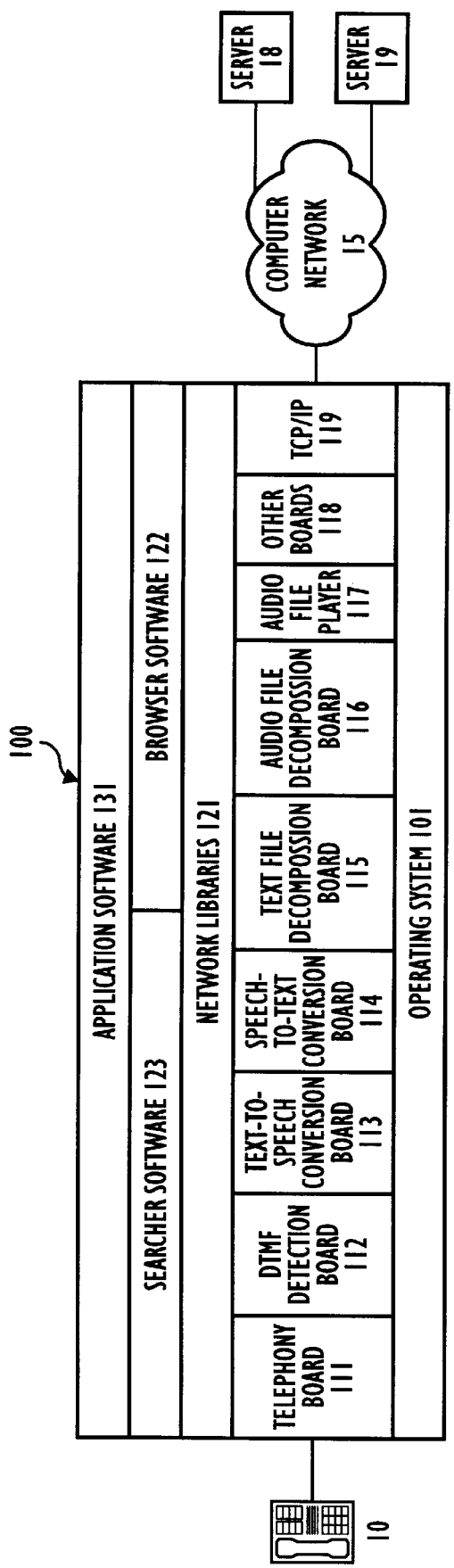
FIG. 1 shows the software and hardware architecture of a preferred embodiment.

FIG. 1 shows the software and hardware architecture of a preferred embodiment. A standard telephone 10, either analog (POTS) or digital (ISDN), may be connected to the architecture 100 using a standard POTS or ISDN telephone line. The architecture 100 is then connected through a computer network 15, such as the Internet, to various servers 18, 19, which may be Web servers running hyper-text transfer protocol (HTTP). Other networks, such as WANs and LANs, and other servers, such as FTP servers and LAN servers, may be connected to a telephone using the architecture.

The architecture 100 is shown in layers to denote an equivalency to the layered architecture model of International Standards Organization Open Systems Interconnection (ISO OSI). Above the physical layer is an operating system 101 such as UNIX or a variation of UNIX. A communication protocol 119, such as transmission control protocol/Internet protocol (TCP/IP), resides above the operating system. Various hardware boards for features such as telephony 111 and DTMF detection 112, text-to-speech conversion 113, speech-to-text conversion 114, text file decompression 115, audio file decompression 116, and audio file playing 117, also reside in this layer. Other boards 118 may be added to provide additional capabilities.

In one embodiment, a Dialogic™ D/41D board, manufactured by Dialogic Corp. in Parsippany, N.J., handles the telephony, DTMF detection, and audio file playing features. A DECtalk™ speech engine, manufactured by Digital Equipment Corp. in Maynard, Mass., handles the text-to-speech conversion. Dragon Dictate™ available from Dragon Systems, Inc. or Direct Talk™ available from IBM may be used to handle speech-to-text conversion for voice command and control.

Above this layer, software applications such as standard network software libraries 121 are provided in order to handle network communications. One example of such a set of libraries specially suited for the World Wide Web (WWW) is published by the National Center for Super-Computing Applications (NCSA). A typical library may include the following modules:

open bookmark files
store bookmarks
delete bookmarks
edit bookmarks
save bookmarks
handles mime types
handle cgi scripts
various character sets
handle interrupts from the computer and networks
download URL's
download files with various options
follow changed URL's to new designations
handles forms, indices, passwords, encryption schemes, etc
handles different forms of user input
connects to news services, internet news, USENET bulletin boards, etc.
gopher connections
save previous URL's and cache/uncache the previously visited network designations
toggle source/presentation for current document
reload the current document
pipe the current document to an external command
quit the browser
quit the browser unconditionally
view the next page of the document
view the previous page of the document
go back two lines in the document
go forward two lines in the document
refresh the screen to clear garbled text
go to the beginning of the current document
go to the end of the current document
make the previous link current
make the next link current
move up the page to a previous link
move down the page to another link
move right to another link
move left to a previous link
display a list of previously viewed documents
go back to the previous document
go to the document given by the current link
go to a document given as a URL
display help on using the browser
display an index of potentially useful documents
force resubmission of form if presently cached interrupt network transmission
return to the first screen (home page)
display and change option settings
allow searching of an index
search within the current document
search for the next occurrence
send a comment to the author of the current document
edit the current document
display information on the current document and link
display choices for printing the current document
add to your personal bookmark list
delete from your personal bookmark list
view your personal bookmark list
escape from the browser to the system
download the current link to your computer
toggle tracing of browser operations
show other commands in the novice help menu
go directly to a target document or action
display the current key map
create a new file or directory
remove a file or directory
modify the name or location of a file or directory
tag a file or directory for later action
display a full menu of file operations
upload from your computer to the current directory
install file or tagged files into a system area
report version
toggle a checkbox Network browser software 122 is also provided. An example of such a browser is available from Netscape Communications, Inc. under the name Netscape Navigator™. The system may also include searcher software 123 in order to assist in locating and indexing documents. Other software 131 is provided for controlling the inputs and outputs of the various boards 111–118. Preferably, all of the software and hardware architecture 100 resides on a single machine, such as a DEC Alpha™1000 4/233 machine.

Figure 2:
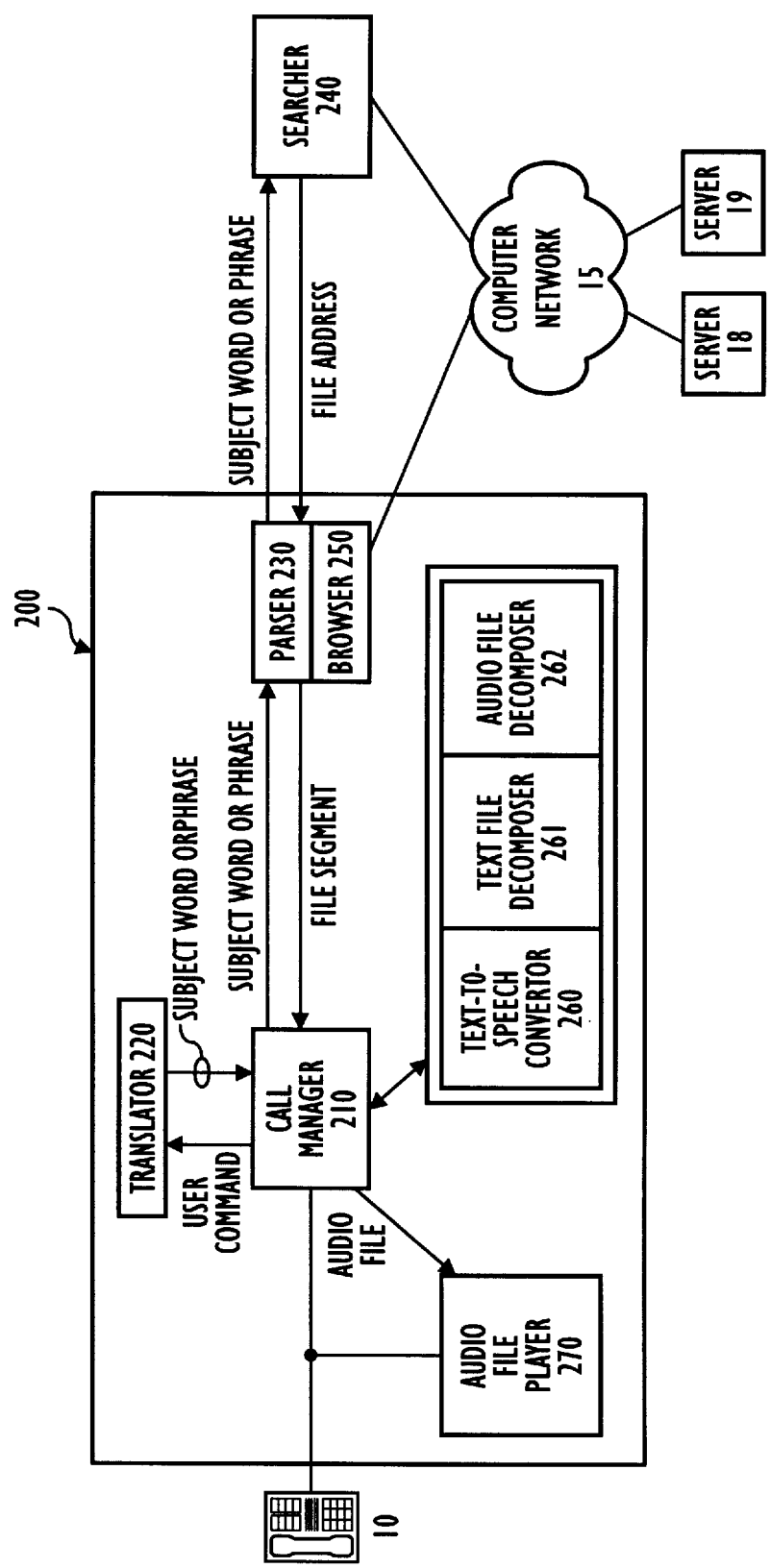
FIG. 2 shows the system architecture of a preferred embodiment.

FIG. 2 shows the system architecture of a preferred embodiment. The condition of a telephone 10 connected to a telephone line coming into the system 200 is analyzed according to a standard telephony interface such as the Dialogic™ D/41D board or an equivalent. For example, the telephony board 111 (shown in FIG. 1) detects whether the telephone 10 is on hook, off hook, busy, ringing, or in another telephony state. A user can initiate connection of a telephone to the system by taking the telephone off hook and dialing a telephone number. When a telephone 10 is connected to the system 200, the Call Manager 210 software implemented on a computer directs the audio file player 270 to recite a voice prompt, such as "You have reached the Audio Web Connection. Please press 1 for local weather information. Please press 2 for local traffic information. Please press 3 for national sports information." This voice prompt may be stored as an audio file, a text file, a compressed audio file, or another type of file. Submenus may also be provided to request information such as the geographic location from which the user is calling or the sport or sports team in which the user is interested. Alternatively, the initial connection can be to access a system document or home page. The system home page may include introductory information and links to other documents such as weather, traffic, or sports. In addition, there may be links to a master directory, a search engine such as Web Crawler™ or any other document, applet, or other function or place permitted by the network protocol, if any.

When a document is accessed, it will be processed advantageously through a parser 230. The parser 230 will interpret the content of the document. Headings, labels, text, graphics, audio information, comments, and other types of content will be identified for the call manager 210 to handle appropriately. Labels, document names, and text may be passed through a text-to-speech converter. Headings and graphics may be either ignored or a signal, such as a tone, may be presented to signify such content. Audio information may be played. Applets may be stored for later execution. Links may invoke a signal to the user identifying information as a link and be processed by the text-to-speech converter. After the entire document is processed or "read," the system may present the user with predetermined options such as repeat document, previous document, terminate/hang up, or help.

The user commands or signals from the user's telephone 10 are captured by the Call Manager 210 and sent to a translator 220 that translates the user's commands from DTMF signals to a subject word or phrase, such as "Washington D.C. area weather," "Silver Spring, Md. traffic," or "Baltimore Orioles," using a DTMF detection board 112 (shown in FIG. 1). Alternatively, voice command and control could be used to request information. For example, instead of entering a number or alphanumeric sequence from a DTMF keypad to select a particular sports team, a user may say, "Baltimore Orioles." This voice information would be translated 220 by a speech-to-text engine 114 (shown in FIG. 1) or interpreted by a voice recognition system, and the system would interpret the voice command as a request for the most recent Baltimore Orioles baseball score. Of course, more advanced and complex voice command and control options may be used to gather information from the user.

Generally, the system will attempt to interpret the user command and then attempt to navigate based on the command. Once the numeric, alphanumeric, or voice command information from the telephone 10 is translated, the subject word or phrase is passed to the Call Manager 210. At this point, the user may choose to invoke a search for related file addresses on the computer network. Otherwise, a predetermined audio-compatible address is selected by the system. The Call Manager 210 then routes this information to the Parser 230, which is a sophisticated software program. The Parser may either match a predetermined file address, stored in memory, to the subject word or phrase or send the subject word or phrase to Searcher 240, which could be a computer program such as Lycos™ or Web Crawler™, to find addresses of files on a target computer network 15 relating to the subject word or phrase. For example, if the target computer network is the Internet, the Searcher may find uniform resource locators (URLs) of Web pages relating to the subject phrase "Washington D.C. area weather." A searcher may be outside of the system 200 (as shown) or part of the system itself (not shown).

If a search is conducted and more than one address is returned by the searcher, the file addresses from the searcher are transformed into an audio menu so that the user may select a single address. A searcher returns an unordered list in HTML, which is transformed into an audio menu by the system. Preferably, the audio menu recites the total number of addresses found by the searcher. Then the audio menu may give instructions for the user to press a DTMF keypad number or say a number corresponding to a menu item, recite the numbers and their corresponding menu items, and process any received signals using DTMF detection board 112 (shown in FIG. 1) or speech-to-text conversion board 114 (shown in FIG. 1). If no menu item has been selected, the audio menu may present additional options to the user, such as recite the menu items again or conduct another search for addresses.

Preferably, the audio menu recites descriptive information returned from the searcher as part of the unordered list. The user may select the amount of descriptive information recited. For example, the user may choose for the system to recite one sentence, or speak for two seconds, or continue to recite until a specified DTMF signal is sent.

Once a single address is selected by the user, or if only one address is found by the Searcher, or if the file address is predetermined, the Parser passes the address to Browser 250 which establishes a connection to the appropriate server 18 through the network 15. Once the connection is established, the Browser 250 downloads the entire requested file and passes the file to the Parser 230. The Parser dynamically analyzes the structure and contents of the downloaded file. For example, if the file is a Web page, the Parser may determine the title of the Web page, find a table, mark occurrences of hyper-text links, find ordered and unordered lists, distinguish images, find captions, denote paragraphs and numbers, locate various abbreviations, and detect compressed or uncompressed audio or audio/video files. If the file is an E-mail message, the Parser may parse header information such as the "From:" field, the "To:" field, the "CC:" field, the time stamp, routing information, and forwarding information. The Parser may also locate the body of the message, appended text, graphics, or audio files, and other segments of standard E-mail formats such as Lotus Notes™ or X.400 or X.500 international standards.

Other standard formats for computer files such as full text databases, ASCII databases, word processing files, and scheduling and itinerary files, may be analyzed by the Parser for audio conversion. The Parser may be modified to analyze any standard file format so that any requested file in that standard format can be converted for an audio interface.

For each file segment, the Parser 230 passes the structure type and the associated text or audio contents to the Call Manager 210, which routes it to the appropriate board to create an audio file to be played by audio file player 270. For example, a compressed text segment may be sent from Parser 230 through Call Manager 210 to a text file decompressor 261 and a text-to-speech convertor 260 for translation into an audio file. The audio file would then be routed through Call Manager 210 to audio file player 270. In another example, a list would be sent to a board that would create an audio menu, and the menu would be transmitted through the Call Manager 210 to the audio file player 270 for speaking to the user. Or a compressed audio or audio/video segment could be sent to an audio file decompressor 262 to create a decompressed audio file that would be sent to the audio file player. Of course, uncompressed audio could be sent straight to the audio file player. Other methods of routing and transforming files and file segments into an audio format may be used. For example, a text-to-speech convertor output could be bridged directly to a telephone line instead of creating an audio file for playing by the audio file player.

Throughout the speaking of audio files by the system, the user may interact with the system using either using DTMF signalling or voice command or both. Various DTMF or voice commands, or a combination of both, may be used to traverse across a document, file or several files. For example, a user may press an alphanumeric DTMF sequence to indicate that the user wants to use a hyper-text link to jump to another file. Alternatively, the user may speak a voice command to repeat a certain section of text or otherwise traverse up and down a file. Or the user could use DTMF signalling to go back to a previously accessed file. Or the user may press a DTMF number to request the name and address of the file so that the user can access an audio/visual version of the file from the user's computer at a later time.

Note that video images, graphics, and other non-compatible content, although retrieved from the target server and copied to the Parser, will not usually be passed out of the Parser, because the audio interface cannot handle video images. Images, however, may be routed to an alternate delivery site at the user's command. For example, a user may hear a caption being read and know that a picture of a weather front is available on the requested file. The user may then request that this picture be sent to the user's facsimile machine or computer (not shown) via DTMF signalling or voice commands.

If, however, an image file has an HTML or other standard format indication that it contains text, such as a facsimile file, the system may use other boards 118 (shown in FIG. 1) such as a character recognition board to convert the image file to a text file. Then, the system may read the text file to a user using the text-to-speech conversion board 113 (shown in FIG. 1).

Figure 3:
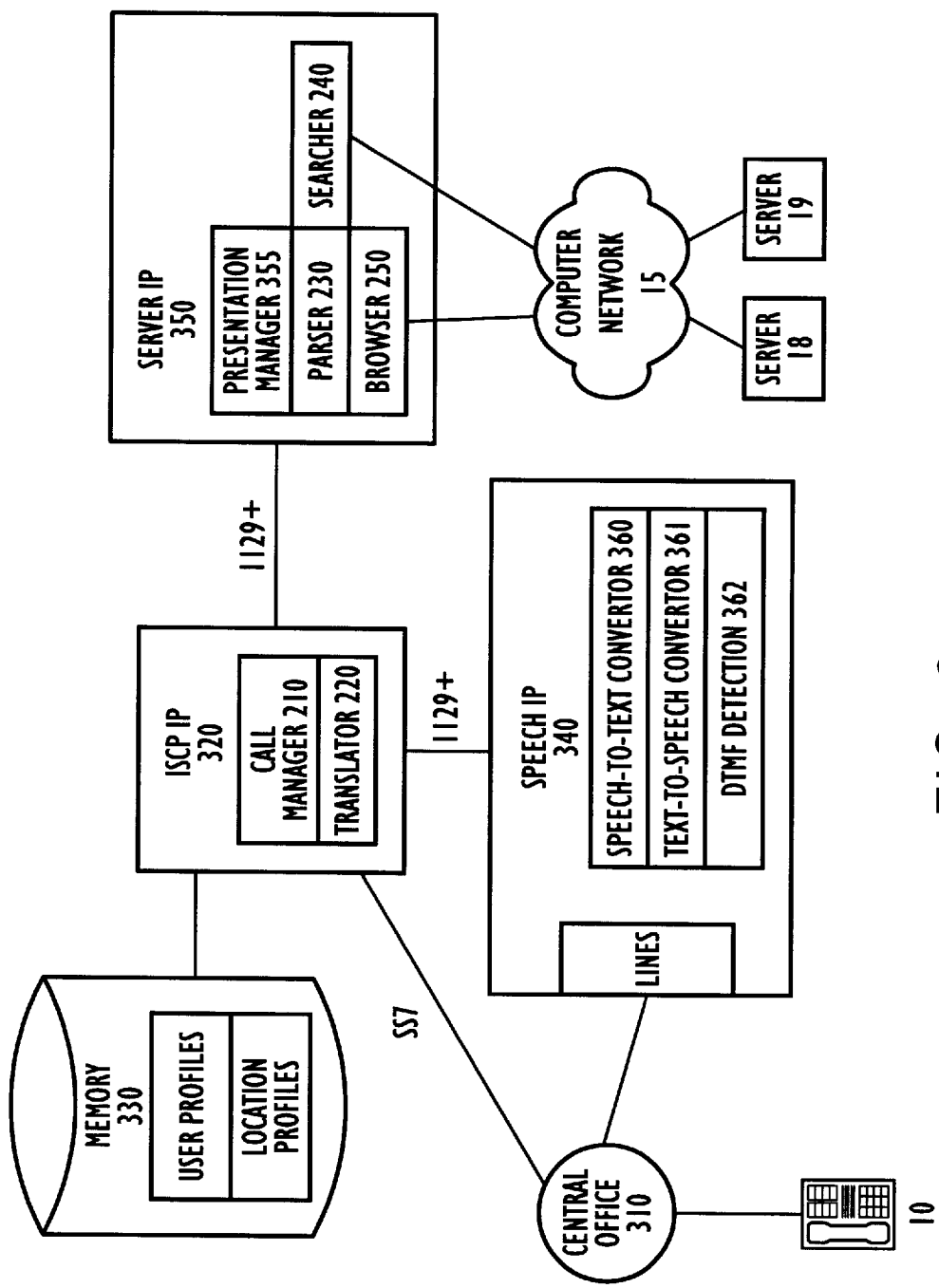
FIG. 3 shows an advanced intelligent network implementation of a preferred embodiment.

FIG. 3 shows an Advanced Intelligent Network (AIN) implementation of a preferred embodiment. An AIN has been developed that overlays ISDN facilities and provides a variety of service features to customers. Because an AIN is independent of ISDN switch capabilities, AIN services can easily be customized for individual users. U.S. Pat. Nos. 5,418,844 and 5,436,957, the disclosure of which is incorporated by reference herein, describe many features and services of the AIN. AIN may use intelligent peripherals (IPs) to implement the system. Bellcore protocol 1129+, or another appropriate protocol, may be used to establish a communication link between an IP and other machines in the AIN. An IP, such as a speech IP, could handle all speech-to-text and text-to-speech conversions within the system. Also, a server IP could handle all interactions of the system with a computer network.

A telephone 10 is connected to a central office 310, which handles telephony interfacing, that is connected to an intelligent signal control point (ISCP) 320 via SS7 signalling. Residing in the ISCP 320 is Call Manager 210 and translator 220, which handles the interactions between the computer network, the requested file, and the user. The Call Manager could reside elsewhere in the system, such as in a server IP.

In a World Wide Web embodiment, the ISCP 320 interacts with Web Server IP 350 via standard 1129+specifications, which contains a parser 230, a searcher 240, and a browser 250 as previously described. A Server IP would also contain a presentation manager 355, which would determine the user's equipment and format the presentation of information from the network appropriately. For example, if a user's equipment was a personal computer rather than a telephone, the presentation manager would modify the presentation format for an audio/visual interface rather than an audio interface.

For an E-mail embodiment, an E-mail server IP may be connected to an ISCP. Similarly, for a LAN or WAN embodiment, a LAN server IP or a WAN server IP may be connected to an ISCP. Other server IPs may be connected to specific computer networks as needed.

The ISCP 320 is also connected, according to 1129+ specifications, to a speech IP 340 for conversion of speech to text 360, text to speech 361, and DTMF detection 362. The speech IP is connected to the telephone 10 through SS7 lines to central office 310.

Preferably, file server memory 330 is connected to ISCP 320 to reduce traffic across the AIN, however, the file server may be connected at any point in the AIN. File server memory 330 contains user profiles and location profiles that direct the creation of custom reports. For example, a certain user regularly checks the closing price of a certain stock and the traffic report for the area near the user's house in Silver Spring, Md. before leaving the office. Instead of traversing several system menus and submenus to access the desired information, that user may have a profile that directs the initial prompt from the system to be, "Press 1 for the Bell Atlantic stock closing price and the traffic report for the Silver Spring area. Press 2 for other menu options." The AIN network could be aware of the availability of a user profile through caller ID or other AIN identification features.

A location profile is similar to a user profile, but instead of depending on a user's personal identity, the location profile depends on a telephone's geographic location. For example, a user who is a traveling salesperson regularly uses the system to check traffic reports from a cellular telephone in the car. A location profile could be triggered by a location ID from the user's cellular telephone and produce an initial prompt that says, "Press 1 for the traffic report for your area. Press 2 for other menu options." For a non-cellular telephone, a caller ID could indicate location information or a location ID. The location ID would be passed to the AIN along with the user's DTMF or voice command signals, and the translated subject word or phrase could include the geographic location corresponding to the location ID.

These caller and location IDs could be used to ensure secure access to sensitive networks or sensitive files. For example, a firewall software program may interact with a server IP so that only users with authorized caller IDs are allowed to access a particular network. Other security arrangements, such as password protection or voice recognition, can also be used by the AIN to restrict access to certain files or networks. Additionally, the AIN may interact with a computer network to ensure proper identification and encryption of financially sensitive information, such as credit card numbers or electronic bank account codes.

Figure 4:
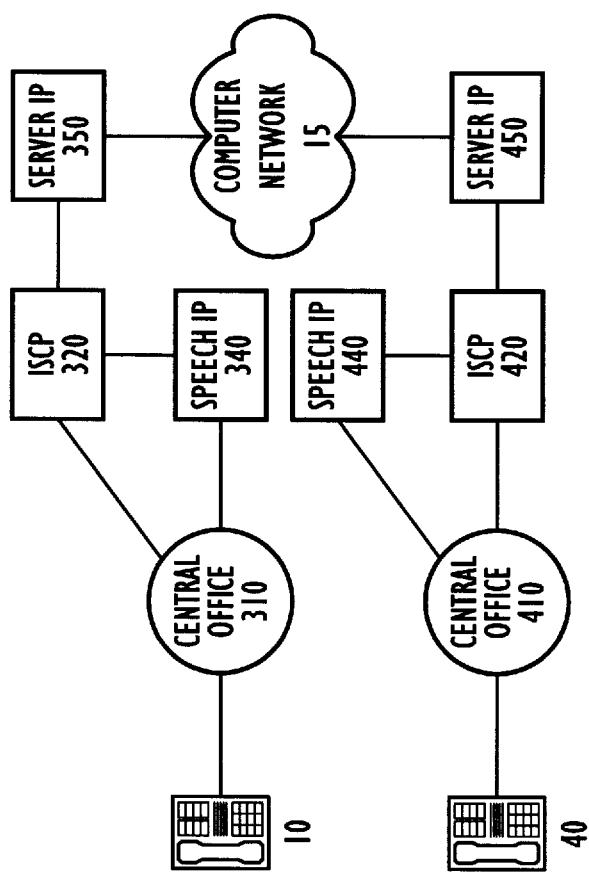
FIG. 4 shows an advanced intelligent network implementation that may be used to implement long distance telephone access across a network.

FIG. 4 shows an advanced intelligent network implementation that may be used to implement long distance telephone access across a network. A user at telephone 10 could request a long distance connection over a computer network 15 and then input the telephone number of the desired telephone 40 using DTMF signalling or voice commands. Once ISCP 320 receives instructions from the user through central office 310, Server IP 350 establishes a connection to the specified telephone 40 across a network 15 through Server IP 450, ISCP 420, and central office 410. Audio information from user's telephone 10 is properly formatted and placed in packets by speech IP 340 for transmission across network 15. Server IP 450 receives the packets of audio information from network 15, and ISCP 420 in conjunction with speech IP 440 decodes the packets to establish a long distance telephone call to telephone 40. Audio information from telephone 40 is transmitted to telephone 10 in a similar manner after a connection is established.

According to the invention, a network search engine may be provided to investigate documents located on a relatively unconstrained network such as the World Wide Web in order to locate documents which are highly compatible with audio presentation of even documents which are specifically labeled to be compatible. The document search may be automated along with the process of indexing such documents. The index may be built and reside on the central system for ease of access by a user by invoking a local search command.

The search engine may be a worm type searcher or other robotic type search engine. It may be one of the application software packages 131 or may be performed by a separate computer. A parser, together with a call manager, can interrogate the documents that are found and determine if the documents reach a threshold level of compatibility. Compatibility can be determined by lack of non-audio or audio-translatable components or other objective criteria. Compatible documents may be indexed. The index may be stored as one or more documents preferably in a hierarchical order. The user may use the navigation commands to traverse the index and invoke a link to a source document.

A system according to the invention may be built on a TCP/IP platform. The system may be used not only for accessing Web pages on an Internet network which uses hyper-text transfer protocol (HTTP), but also for accessing E-mail on a Novell™ IPX/SPX or other network, accessing files via file transfer protocol (FTP) or Gopher, accessing files via asynchronous transfer protocol (ATM), or any other computer network that supports TCP/IP. The system may also be modified to encompass standard voice mail formats and other IVR systems.

This system may, of course, be carried out in specific ways other than those set forth here without departing from the spirit and essential characteristics of the invention. Therefore, the presented embodiments should be considered in all respects as illustrative and not restrictive and all modifications falling within the meaning and equivalency range of the appended claims are intended to be embraced therein.

We claim:

1. An interface system for presenting one or more computer documents in an audio format and navigating through said documents, comprising:
   an audio interface for receiving a user command;
   a call manager connected to the audio interface for controlling the routing of information to and from the audio interface;
   a translator connected to the call manager for translating the user command into a subject word or phrase;
   a browser connected to the call manager for retrieving a document identified by a link from a computer network related to the subject word or phrase;
   a parser connected to the call manager for parsing the document into file segments according to the standard format;
   an audio file player connected to the call manager for playing audio file segments contained in the document to the audio interface.

2. An interface system according to claim 1 wherein the user command comprises a dual-tone multi-frequency signal.

3. An interface system according to claim 2 wherein the user command comprises a user voice commands.

4. An interface system according to claim 1 wherein the user command comprises a user voice commands.

5. An interface system according to claim 4 further comprising a voice recognition engine associated with said call manager.

6. An interface system according to claim 4 further comprising a speech-to-text converter associated with said call manager.

7. An interface system according to claim 1 further comprising:
   a searcher connected to the call manager for searching a computer network for file addresses of files related to the subject word or phrase.

8. An interface system according to claim 1 further comprising:

a computer memory connected to the parser for storing predetermined file addresses.

9. An interface system according to claim 1 further comprising:
a transformer connected to the call manager for transforming a non-audio file segment into an audio file segment.

10. An interface system according to claim 9 wherein the transformer comprises a text-to-speech converter.

11. An interface system according to claim 10 wherein the transformer comprises a file decompression unit.

12. An interface system according to claim 9 wherein the transformer comprises an audio decoder.

13. An interface system according to claim 1 wherein the translator comprises a dual-tone multi-frequency detector.

14. An interface system according to claim 13 wherein the translator comprises a speech-to-text converter.

15. An interface system according to claim 1 wherein the translator comprises a speech-to-text converter.

16. An interface system for presenting one or more computer documents in an audio format and for navigating through said documents comprising:
(A) an intelligent signal control point comprising:
  (1) a call manager for controlling the routing of information to and from an audio interface; and
  (2) a user command interpreter connected to the audio interface;
(B) a server intelligent peripheral connected to the intelligent signal control point comprising:
  (1) a browser for retrieving documents identified by a link from one or more computer storage facilities; and
  (2) a parser for parsing the document into segments according to the content of the document; and
  (3) a presentation manager for directing the presentation of the segments; and
(C) a speech intelligent peripheral connected to the intelligent signal control point comprising:
  (1) a speech-to-text converter; and
  (2) a text-to-speech converter.

17. An interface system according to claim 16 wherein the server intelligent peripheral further comprises a searcher for searching the computer storage facilities for documents according to a predetermined criteria and indexing documents that satisfy said criteria along with an address of said documents.

18. An interface system according to claim 16 further comprising computer memory connected to the intelligent signal control point.

19. An interface system according to claim 18 wherein the memory contains a caller identification for identifying a user of the audio interface.

20. An interface system according to claim 18 wherein the memory contains a location identification for identifying the location of the audio interface.

21. An interface system according to claim 16 wherein the user command comprises a dual-tone multi-frequency signal.

22. An interface system according to claim 16 wherein the user command comprises a user voice command.

23. An interface system according to claim 22 further comprising a voice recognition engine associated with said call manager.

24. An interface system according to claim 22 further comprising a speech-to-text converter associated with said call manager.

25. A document navigation and audio presentment method comprising the steps of:
accessing a computer document;
interpreting content of the document;
converting segments of the document to audio information based on the interpretation of the content of the segments;
navigating through said document responsive to user commands; and
invoking actions dictated by content of said document in response to a user command.

26. A method according to claim 25 wherein the step of converting comprises the step of playing audio files.

27. A method according to claim 25 wherein the step of converting comprises the step of text-to-speech conversion.

28. A method according to claim 27 wherein the step of converting comprises imposing different audio characteristics on different types of segments.

29. A method according to claim 25 wherein the step of invoking content based actions comprises the step of accessing linked documents when the content is a link to a second computer document.

30. A method according to claim 25 wherein the step of accessing comprises accessing locally stored documents.

31. A method according to claim 25 wherein the step of accessing comprises accessing remotely stored documents.

32. A method according to claim 25 wherein the step of accessing comprises accessing documents stored in a computer network.

33. An audio interface system comprising:
a document access and retrieval unit associated with one or more computer document storage facilities;
a parser, associated with said access and retrieval unit, which identifies the format of segments of retrieved documents based on the type of content contained in said segments;
one or more audio output devices, responsive to the parser, wherein said audio output devices convert segments of said document to audio information in accordance with the format of said segments;
a linker capable of retrieving documents identified by a link when the content contained in said segments is a document link.

34. An audio interface system according to claim 33 where the audio information is a signal suitable to be played to a user through a telephone.

35. An audio interface system according to claim 33 further comprising:
a command response unit, responsive to a user command, for controlling document presentation.

36. An audio interface system according to claim 35 wherein said access and retrieval unit is connected to said command response unit.

37. An audio interface system according to claim 35 wherein said command response unit is responsive to content of said document subject to user commands.

38. An audio interface system according to claim 37 wherein, responsive to a user command, said command response unit will instruct the access and retrieval unit to retrieve a second document based on the content of a first document.

* * * * *